No. 631,692. Patented Aug. 22, 1899.
J. W. BREEDING.
CAR WHEEL.
(Application filed June 20, 1899.)
(No Model.)
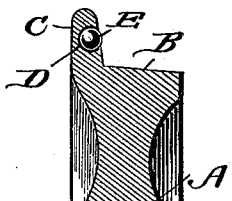
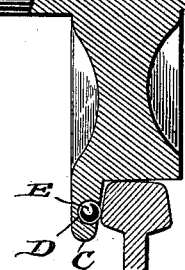
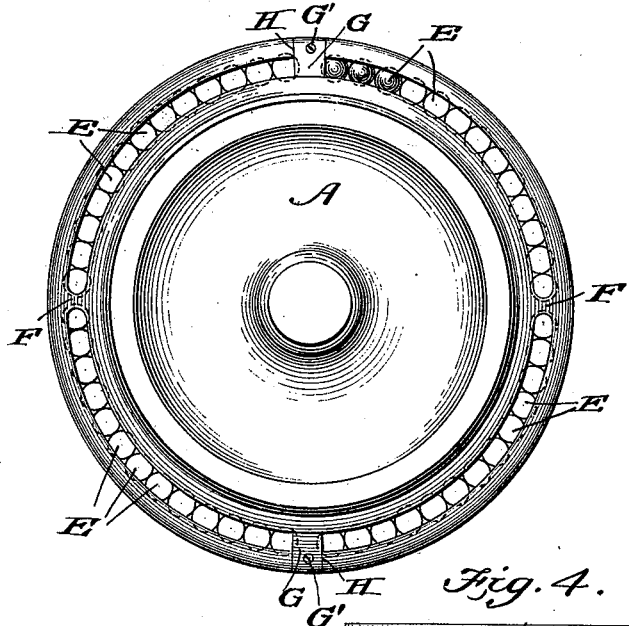
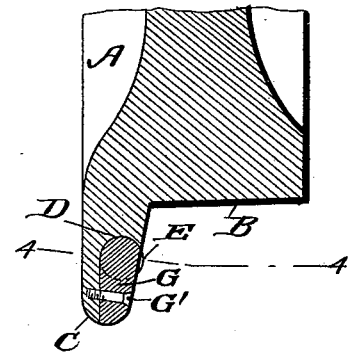
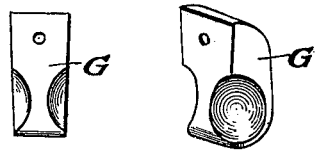
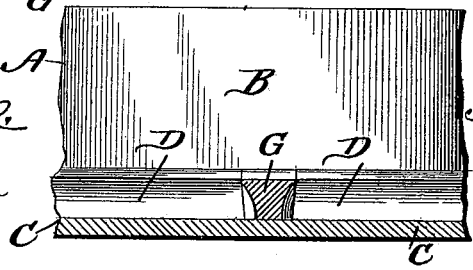
WITNESSES:
M. D. Blondel
Perry B. Turpin
INVENTOR
John W. Breeding
BY Munn & Co.
ATTORNEYS.
THE NORRIS PETERS CO., PHOTO-LITHO., WASHINGTON, D. C.

UNITED STATES PATENT OFFICE.

JOHN W. BREEDING, OF BISBEE, ARIZONA TERRITORY, ASSIGNOR OF ONE-THIRD TO EMIL MARKS AND RICHARD P. BROWN, OF SAME PLACE.

CAR-WHEEL.

SPECIFICATION forming part of Letters Patent No. 631,692, dated August 22, 1899.

Application filed June 20, 1899. Serial No. 721,243. (No model.)

*To all whom it may concern:*

Be it known that I, JOHN W. BREEDING, a citizen of the United States, residing at Bisbee, in the county of Cochise and Territory of Arizona, have invented a new and useful Improvement in Car-Wheels, of which the following is a specification.

My invention is an improvement in car-wheels, having for an object to provide an improved construction by which to prevent the wheel from climbing the track-rail; and the invention consists in certain novel constructions and combinations of parts, as will be hereinafter described, and pointed out in the claims.

In the drawings, Figure 1 is a vertical sectional view of a car-wheel provided with my improvements in place on a rail. Fig. 2 is a face view of the wheel. Fig. 3 is a detail enlarged section of the rim portion of the wheel. Fig. 4 is a detail section on about line 4 4 of Fig. 3. Fig. 5 illustrates in detail one of the removable blocks for closing the loading-opening, and Fig. 6 is a partial detail edge view.

The car-wheel A is formed with the tread B and the flange C, and may in general respects be of any suitable construction.

As is well known, car-wheels, especially when somewhat worn, have a tendency to climb the rail, which results in many accidents. By my invention I provide the flange C with balls, which protrude from its inner face and are adapted to turn freely in all directions, whereby they will offer no friction or resistance to the movement of the wheel upon the rail and may also turn freely in a direction radial to the wheel, so in case the wheel starts to climb the rail the balls will turn in a direction radial to such wheel, thus causing it to slip back to its proper position upon the rail. By this means I avoid any lifting movement of the wheel-flange alongside the track-rail, and thus avoid all accidents resulting from the climbing of the wheel upon the rail.

In the construction shown I provide the flange C in its inner face with a circumferentially-extended undercut raceway D for the balls E. This raceway is arranged about midway between the tread B and the outer edge of the flange C and is so formed relatively to the balls E as to permit the latter to protrude from the inner face of the flange C sufficiently far to operate upon the rail, as before described. It is desired to prevent the balls from moving bodily circumferentially of the wheel, and for such reason I prefer to divide the raceway D by cross-partitions F F and G G into a series of segmental sections. The partitions G are arranged alternately with the partitions F and are removable to facilitate loading the balls into the raceway. To this end I provide the wheel-flange with undercut slots H, intersecting the raceway D, and form the partitions G to fit the slots H, as will be understood from Figs. 2, 3, and 5. When inserted, as shown in Fig. 2, the partition-blocks are suitably held, it may be, by means of screws G', as shown in Fig. 3. The blocks G, it will be noticed, operate both to form a partition for abutment by the balls in the raceway and to close the loading-opening, which leads through the undercut raceway for the balls.

Having thus described my invention, what I claim, and desire to secure by Letters Patent, is—

1. A car-wheel having a tread and a flange and provided with balls supported in its flange and protruding from the inner face thereof and adapted to turn in a direction radial to the wheel whereby to avoid any lifting movement of the wheel-flange alongside the track-rail, substantially as set forth.

2. A car-wheel provided with a tread and a flange and provided in the inner face of its flange with a circumferentially-extending undercut raceway and with balls held in said raceway and protruding from the inner face of the flange substantially as set forth.

3. A car-wheel provided with a tread and a flange and having in the inner face of its flange a circumferentially-extended raceway divided by cross-partitions into segmental sections, and balls held in said raceway and protruding from the inner face of the wheel-flange, substantially as set forth.

4. A car-wheel having its flange provided in its inner face with a circumferentially-extended undercut raceway for balls and with a loading-opening leading to said raceway, and the removable block fitting said loading-opening and extending across the raceway whereby to form a partition for abutment by the balls in the raceway, substantially as set forth.

JOHN W. BREEDING.

Witnesses:
SOLON C. KEMON,
PERRY B. TURPIN.